United States Patent [19]
Ozkan et al.

[11] Patent Number: 5,933,451
[45] Date of Patent: Aug. 3, 1999

[54] COMPLEXITY DETERMINING APPARATUS

[75] Inventors: Mehmet Kemal Ozkan, Indianapolis, Ind.; Regis Saint Girons, Fourqueux, France

[73] Assignee: Thomson Consumer Electronics, Inc., Indianapolis, Ind.

[21] Appl. No.: 08/727,435

[22] PCT Filed: Apr. 22, 1994

[86] PCT No.: PCT/US94/04456

§ 371 Date: Oct. 15, 1996

§ 102(e) Date: Oct. 15, 1996

[87] PCT Pub. No.: WO95/29541

PCT Pub. Date: Nov. 2, 1995

[51] Int. Cl.⁶ ............................................. H04B 3/46
[52] U.S. Cl. .................. 375/224; 375/249; 375/247; 348/353
[58] Field of Search ........................... 348/405, 419, 348/415, 409, 402, 423, 390, 396, 518, 353; 386/109; 375/224, 247, 249

[56] References Cited

U.S. PATENT DOCUMENTS

| | | | |
|---|---|---|---|
| 5,115,309 | 5/1992 | Hang | 358/133 |
| 5,144,424 | 9/1992 | Savatier | 358/133 |
| 5,231,494 | 7/1993 | Wachob | 358/146 |
| 5,263,100 | 11/1993 | Kim et al. | 382/56 |
| 5,301,242 | 4/1994 | Gonzales et al. | 382/56 |
| 5,333,012 | 7/1994 | Singhal et al. | 348/353 |
| 5,521,643 | 5/1996 | Yim | 348/419 |
| 5,543,844 | 8/1996 | Mita et al. | 348/405 |
| 5,719,986 | 2/1998 | Kato et al. | 386/109 |

OTHER PUBLICATIONS

Haskell, "Buffer and Channel Sharing by Several Interframe Picturephone Coders", The Bell System Technical Journal, vol. 51, Jan. 1972, pp. 261–289.

Kishino et al., "Variable Bit–Rate Coding of Video Signals for ATM Networks", IEEE Journal on Selected Areas in Communications, vol. 7, No. 5, Jun. 1989, pp. 801–806.

Zdepski et al., Statistically Based Buffer Control Policies for Constant Rate Transmission of Compressed Digital Video, IEEE Transactions on Communications, vol. 39, No. 6, Jun. 1991, pp. 947–957.

*Primary Examiner*—Stephen Chin
*Assistant Examiner*—Shuwang Liu
*Attorney, Agent, or Firm*—Joseph S. Tripoli; Eric P. Herrmann; Ronald H. Kurdyla

[57] ABSTRACT

Apparatus for determining a complexity measure of a data signal is disclosed which includes an encoder, having an input terminal responsive to a data input signal and a data output terminal producing a coded output signal representing the data input signal at a constant bit rate. The encoder includes a variable quantizer, responsive to the data input signal, for producing a quantized signal, representing the data input signal, having a quantizing step size defined in response to a quantizing step size control signal. A bit rate regulator produces the quantizing step size control signal in response to the bit rate of the coded output signal and a quota input signal. A complexity analyzer generates a complexity representative signal related to the quantizing step size and the bit rate of the coded output signal.

3 Claims, 3 Drawing Sheets

COMPLEXITY DETERMINING APPARATUS

The present application relates to apparatus for determining the complexity of a data signal; in particular, complexity determining apparatus in a data processing system using a constant bit rate encoder.

BACKGROUND OF THE INVENTION

It is sometimes useful to have an indication of the complexity of a data signal. For example, it has been proposed to multiplex a plurality of coded video signals, each encoded using a constant bit rate (CBR) encoder. The bit rate allocated to each of the CBR encoders is dynamically varied, based on both the coding complexity of the video signal being encoded, and the combined complexities of all of the video signals being multiplexed. In such a system, video signals having relatively high coding complexity are allocated a higher bit rate than those having relatively low coding complexity.

One known measure of the complexity of a data signal is the number of bits necessary to encode the signal using a variable bit rate (VBR) encoder: more bits indicate higher complexity, and conversely, fewer bits indicate lower complexity. A VBR encoder is a complex electronic system, however, and adding a VBR encoder for each signal to be multiplexed to determine the complexity of that signal is expensive and results in lowered reliability due to the added complex circuitry. It is desirable to provide an indication of the complexity of an input data signal, without the added expense and decreased reliability of a complex electronic system.

BRIEF SUMMARY OF THE INVENTION

The inventors have realized that CBR encoders maintain a constant bit rate by varying the quantization step size of the signal being encoded. In general, more complex signals require more bits to encode than less complex signals. However, in a CBR encoder, more complex signals are encoded with a larger quantization step size (or fewer quantizing levels), and less complex signals are encoded with a smaller quantization step size (or more quantization levels). Fewer quantization levels require fewer bits to encode them, which offsets the increased bits which would be necessary to encode the higher complexity signal and allows the signal to be encoded at the allocated constant bit rate.

The inventors have further realized that the relationship between the quantization step size and the resulting number of bits in the coded signal is approximately inversely linear. I.e. doubling the quantizing step size reduces the bit count by half. If a data signal having a given complexity is supplied to a CBR encoder to be encoded at a first predetermined bit rate, the CBR encoder will calculate and apply an appropriate quantization step size to produce an encoded signal at that first bit rate. If the same signal is to be encoded, but at a second predetermined bit rate twice the first predetermined bit rate, the quantization step size calculated by the CBR encoder will be half the quantization step size determined for the first predetermined bit rate. Thus, the product of the quantization step size and the resulting number of bits into which the signal is encoded is constant for a signal of a given complexity.

If a second data signal, having a higher complexity than the above data signal, is supplied to the CBR encoder to be encoded at the above first predetermined bit rate, the calculated quantization step size will be larger than that for the above data signal in order to maintain the first predetermined bit rate. The product of the quantization step size and resulting number of bits will, thus, be greater than that for the above, less complex data signal. However, for this second data signal, this product will be constant, regardless of the allocated bit rate. The inventors, thus, have recognized that the product of the quantization step size and the resulting number of bits in the coded signal varies with the complexity of the data signal, but is independent of the bit rate allocated to the CBR to encode that signal.

In accordance with principles of the present invention, apparatus for determining a complexity measure of a data signal includes an encoder, having an input terminal responsive to a data input signal and a data output terminal producing a coded output signal representing the data input signal at a constant bit rate. The encoder includes a variable quantizer, responsive to the data input signal, for producing a quantized signal, representing the data input signal, having a quantizing step size set in response to a quantizing step size control signal. A bit rate regulator produces the quantizing step size control signal in response to the bit rate of the coded output signal and a quota input signal. A complexity analyzer generates a complexity representative signal related to the quantizing step size and the bit rate of the coded output signal.

Apparatus according to the present invention provides a measure of the complexity of a data input signal which does not require complex circuitry in addition to the already present CBR encoder. Instead, the required information signals, the quantizing step size and the resulting bit rate, are already present in the CBR encoder. All that is required is to tap these signals, and perform a simple calculation. In addition, the complexity measure is independent of the desired bit rate of the CBR encoder.

DETAILED DESCRIPTION OF A PREFERRED EMBODIMENT

Figure 1:
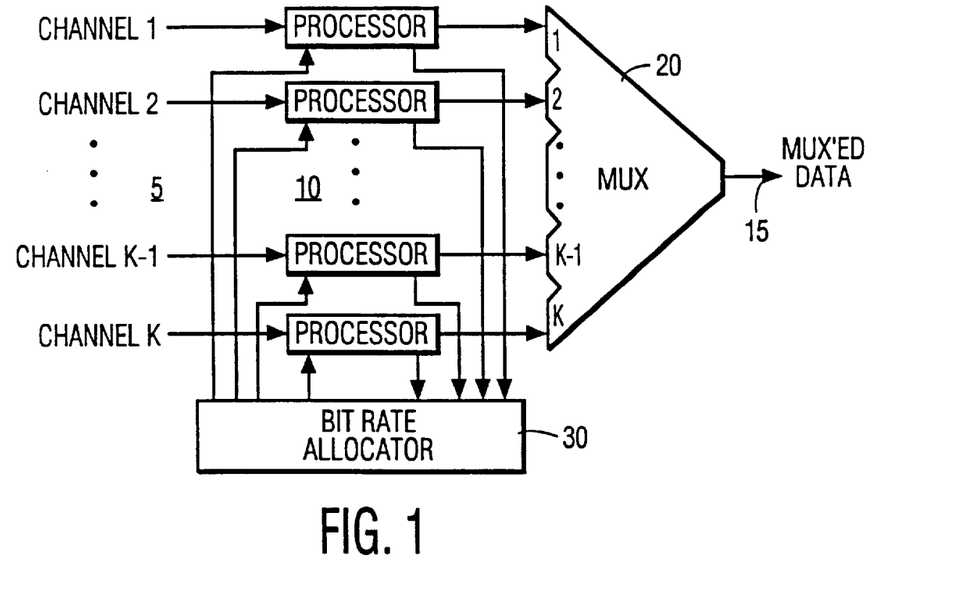
FIG. 1 is a block diagram of a multiplexer system including complexity determining apparatus according to the present invention.

FIG. 1 is a block diagram of a multiplexer system incorporating the present invention. In FIG. 1, all signal paths are illustrated as single signal lines. However, one skilled in the art will understand that the illustrated signal paths could carry multibit digital signals, either in parallel, in which case the signal paths would be composed of multiple signal lines, or serially, in which case the signal paths could be a single data line and/or include a data and clock signal line. Other control and clock signal paths, not germane to the understanding of the present invention have been omitted from the figure to simplify it.

In FIG. 1 a plurality of input terminals 5 are coupled to sources (not shown) of video signals (CHANNEL 1–CHANNEL K) which are to be transmitted together over a data link. The plurality of input terminals 5 are coupled to respective data input terminals of a corresponding plurality of channel processors 10. Respective data output terminals of the plurality of channel processors 10 are coupled to corresponding data input terminals 1–K of a multiplexer (MUX) 20. A data output terminal of multiplexer 20 is coupled to an output terminal 15 of the multiplexer system. Output terminal 15 is coupled to utilization circuitry (not shown) for transmitting the multiplexed data stream (MUX'ED DATA) over the transmission link.

Each of the plurality of channel processors 10 further includes a complexity output terminal and a control input terminal. The respective complexity output terminals of each of the plurality of channel processors are coupled to corresponding complexity input terminals of a bit rate allocator 30, and respective quota output terminals of the bit rate allocator 30 are coupled to the corresponding control input terminals of the plurality of channel processors 10.

In operation, each channel processor receives a signal at its control input terminal representing the bit rate allocated to it for the next quota period. The channel processor then encodes the signal at its data input terminal for the next quota period into a digitally encoded signal at the allocated bit rate. The encoded data signal is supplied to the corresponding input terminal of multiplexer 20. Multiplexer 20 operates in a known manner to combine the signals from all the channel processors into a multiplexed data stream. The multiplexed data stream is then supplied to the circuitry comprising the data link for transmission, also in a known manner.

During the encoding process, the channel processor 10 generates a signal at its complexity output terminal representing the coding complexity of the signal being encoded. The bit rate allocator 30 receives the signals from the complexity output terminals of the channel processors 10, and, based on all of the complexity signals, dynamically adjusts the bit rate quotas for the next quota period among the plurality of channel processors 10. In a preferred embodiment, more complex signals are dynamically allocated a relatively higher bit rate than less complex signals. Different methods of determining the complexity of the video signal and for allocating bit rates based on the complexities are described below.

Figure 2:
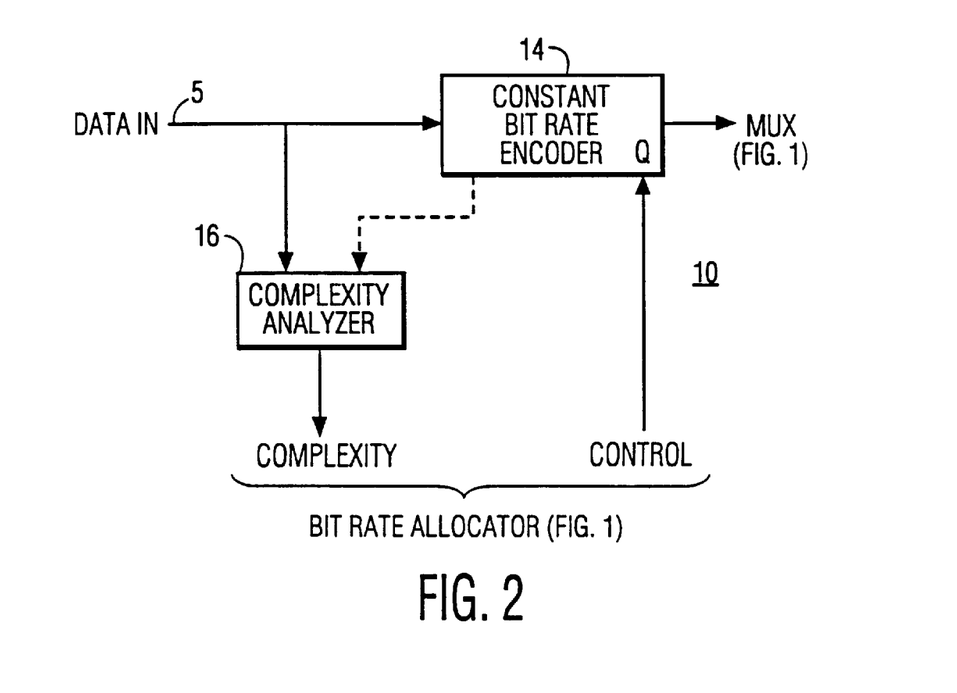
FIG. 2 is a block diagram of a channel processor which may be used in the multiplexer system illustrated in FIG. 1.

FIG. 2 is a block diagram of a channel processor which may be used in the multiplexer system illustrated in FIG. 1. In FIG. 2, elements similar to those in FIG. 1 are designated by the same reference number, and are not described in detail below. In FIG. 2, a data input terminal 5 is coupled a video signal source (not shown). Data input terminal 5 is coupled to a data input terminal of a constant bit rate encoder (CBR) 14, and a complexity analyzer 16. A data output terminal of the CBR encoder 14 is coupled to an input terminal of multiplexer (MUX) 20 (of FIG. 1). A control input terminal (CONTROL) of the channel processor 10 is coupled to a quota input terminal Q of the CBR encoder 10. An output terminal of the complexity analyzer 16 is coupled to the complexity output terminal (COMPLEXITY) of the channel processor 10.

In operation, the complexity analyzer 16 analyzes the complexity of the video signal at the data input terminal 5. A signal is produced at the output terminal of the complexity analyzer 16 representative of the complexity of the input signal. The complexity representative signal is supplied to the bit rate allocator 30 (of FIG. 1). In response to this complexity signal (and those of the other channel processors 10), bit rate allocator 30 provides a signal to the control input terminal (CONTROL) of this channel processor 10 (and the other channel processors 10) representing the bit rate allocated to this channel processor 10. The CBR encoder 14 provides a data path between its data input and data output terminals for producing an output signal encoded at a constant bit rate. The constant bit rate is set in response to the signal at the quota input terminal Q from the control input terminal (CONTROL) of the channel processor 10 from the bit rate allocator 30.

It is possible that circuitry in the CBR encoder 14 can also be utilized by the complexity analyzer 16 in performing its analysis. In such a case, data is supplied from within the CBR encoder 14 directly to the complexity analyzer 16, as illustrated in phantom in FIG. 2. Such data from the CBR encoder 14 may supplement data from the input terminal 5, or replace it altogether, in which case there is no direct connection of the complexity analyzer to the data input terminal 5.

Figure 3:
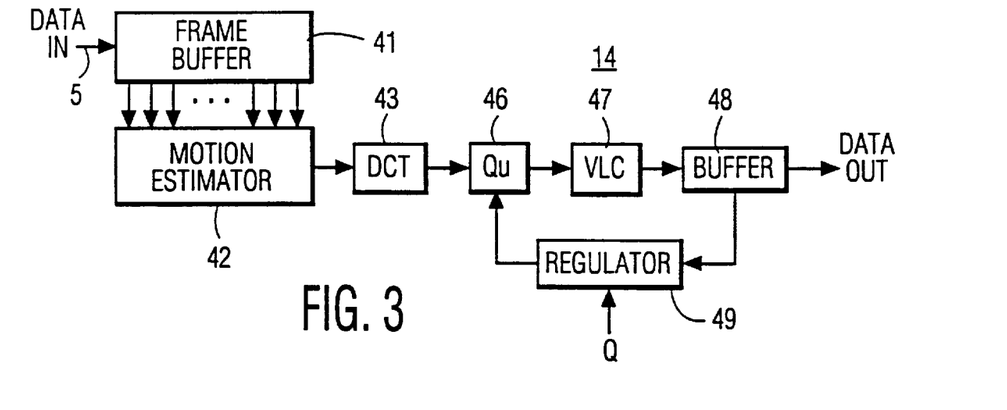
FIG. 3 is a block diagram of a portion of an MPEG encoder which may be used in the channel processor illustrated in FIG. 2.

In a preferred embodiment, each CBR encoder 14 is an encoder which compresses and encodes a video signal in accordance with a standard promulgated by the Moving Picture Expert Group (MPEG), termed an MPEG encoder. FIG. 3 is a block diagram illustrating a portion of an MPEG encoder 14. The known components of the MPEG encoder 14 will not be described in detail below. MPEG encoders include other elements, not germane to an understanding of the present invention, which have been omitted from the figure to simplify it.

In FIG. 3, a data input terminal 5 (DATA IN) of MPEG encoder 14 is coupled to a source (not shown) of a video signal to be compressed and encoded. Input terminal 5 is coupled to an input terminal of a frame buffer 41. Frame buffer 41 includes a plurality of frame period buffers or delay lines and a plurality of output terminals producing respective signals representing portions of different, but temporally adjacent, frames or pictures. The plurality of output terminals of the frame buffer 41 are coupled to corresponding input terminals of a motion estimator 42. An output terminal of the motion estimator is coupled to a discrete cosine transform (DCT) circuit 43. An output terminal of DCT circuit 43 is coupled to a data input terminal of a variable quantizer (Qu) circuit 46. An output terminal of variable quantizer circuit 46 is coupled to an input terminal of a variable length coder (VLC) 47. An output terminal of VLC 47 is coupled to an input terminal of an output buffer 48. A data output terminal of output buffer 48 is coupled to a data output terminal (DATA OUT) of MPEG encoder 14. Data output terminal (DATA OUT) of MPEG encoder 14 is coupled to a corresponding input terminal of multiplexer 20 (of FIG. 1).

A status output terminal of output buffer 48 is coupled to a status input terminal of a bit rate regulator 49. A control output terminal of bit rate regulator 49 is coupled to a control input terminal of variable quantizer 46. A quota input terminal Q of MPEG encoder 14 is coupled to a corresponding quota output terminal of bit rate allocator 30. The quota input terminal Q of the MPEG encoder 14 is coupled to a control input terminal of regulator 49.

In operation, MPEG encoder 14 operates in a known manner to compress and encode the video signal at its input terminal for the next quota period at a bit rate determined by the signal at its Q input terminal. In the following example, an MPEG encoder encoding a video signal partitioned into groups (GOPs) consisting of twelve pictures or frames is described. However, it should be understood that the number of pictures or frames in a GOP can vary. Also in the following example, it is assumed that the bit rate allocation for each MPEG encoder is updated once each GOP, i.e. the quota period is the GOP period. However, it should also be understood that the quota period may be different, and may even vary over time.

The frame buffer 41 receives and stores data representing the portion of the twelve frames in the exemplary GOP currently being encoded necessary to perform motion estimation, in a manner described below. This data is supplied to motion estimator 42. In the preferred embodiment, the first one of the twelve frames or pictures is used as a reference frame (I frame), and is passed through the motion estimator to DCT circuit 43. For the remainder of the frames, a motion vector is generated in motion estimator 42 for each one of a plurality of 16 pixel by 16 line blocks in each picture or frame, termed macroblocks in the MPEG standard document, either from preceding frames alone (P frames), or interpolated from both preceding and succeeding frames (B frames). As described above, frame buffer 41 holds the data necessary for the motion estimator to perform the estimation from preceding frames or the interpolation from preceding and succeeding frames. The generated motion vectors for a particular frame are then compared to the actual data in the frame being estimated and a motion difference signal is generated, and supplied to DCT circuit 43.

In the DCT circuit 43, the 16 pixel by 16 line macroblocks of spatial data from the I frame and motion difference signals from the P frames and B frames are divided into six 8 pixel by 8 line blocks (four luminance blocks, and two sub-sampled chrominance blocks) termed microblocks in the remainder of this application, in accordance with the MPEG standard document. A discrete cosine transform is performed on each microblock. The resulting 8 by 8 blocks of DCT coefficients are then supplied to variable quantizer 46. The 8 by 8 blocks of coefficients are quantized, scanned in a zig-zag order and supplied to VLC 47. The quantized DCT coefficients, and other side information (related to parameters of the encoded GOP), representing the GOP are encoded using run-length coding in the VLC 47, and supplied to output buffer 48.

It is known that the most direct way to control the output bit rate of VLC 47, and thus maintain the allocated constant bit rate for the MPEG encoder 14, is to control the number of quantizing levels (or, put another way, the quantizing step size) to be used for quantizing each block of DCT coefficients in the variable quantizer 46. The control signal supplied to the variable quantizer 46 from the bit rate regulator 49 performs this controlling function. Within a quota period, which is the period between successive bit rate quota update signals from the bit rate allocator 30 (of FIG. 1), the bit rate regulator 49, in known manner, supplies a control signal to the variable quantizer 46 which varies the number of levels into which each 16 by 16 macroblock in the GOP is being quantized in order to maintain the allocated bit rate for that quota period. The bit rate allocation for the bit rate regulator 49 in the present example is varied for each GOP period in response to the coding complexity values of the video signals in each of the plurality of channels, in a manner described below.

Figure 4:
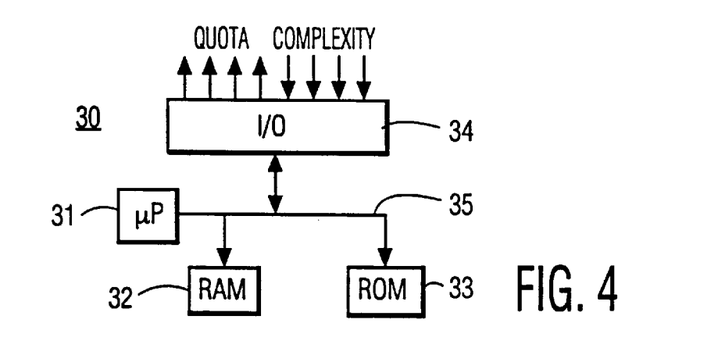
FIG. 4 is a block diagram of a bit rate allocator which may be used in the multiplexer system illustrated in FIG. 1.

In a preferred embodiment, bit rate allocator 30 (of FIG. 1), is a computer system having connections coupled to various circuit components in the plurality 10 of channel processors. FIG. 4 is a block diagram of the hardware forming the bit rate allocator 30. In FIG. 4, a microprocessor ($\mu$P) 31 is coupled to a read/write memory (RAM) 32, a read-only memory (ROM) 33 and an input/output (I/O) controller 34 over a computer system bus 35. There are other components of the computer system, such as mass storage devices, and user terminals, which have not been illustrated in order to simplify the figure. The I/O controller 34 has a plurality of input terminals (COMPLEXITY) coupled to corresponding complexity output terminals of the plurality 10 of channel processors (of FIG. 1) and a plurality of output terminals (QUOTA) coupled to corresponding quota input terminals of the plurality 10 of channel processors.

The microprocessor 31, RAM 32, ROM 33 and I/O controller 34 operate as a computer system in known manner to execute programs stored in the ROM 33, store and retrieve data in the RAM 32 and receive data from and transmit data to the devices attached to the I/O controller 34. The data representing the current coding complexity of the video signals being encoded in the plurality 10 of channel processors (of FIG. 1) are received from the corresponding output terminals of those channel processors at the I/O controller 34 via the COMPLEXITY input terminals in a manner described below. The microprocessor 31 is notified of the receipt of this data in a known manner, e.g. polling, interrupt, etc. The microprocessor 31 retrieves those signals from the I/O controller 34 via the computer system bus 35, determines the quota of bits for the next quota period for each of the encoders, and supplies signals representing those quotas to the plurality 10 of channel processors via the QUOTA output terminals at the next quota period.

Figure 5:
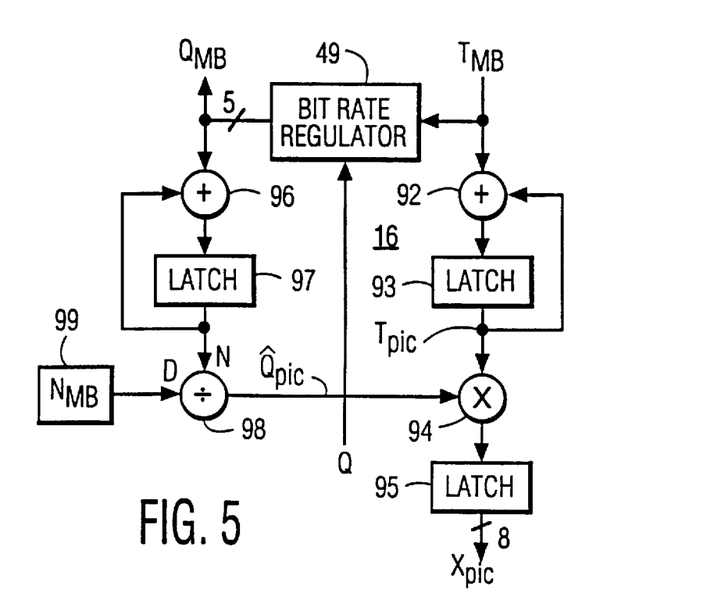
FIG. 5 is a more detailed block diagram of a complexity analyzer which may be used in the channel processor illustrated in FIG. 2.

A preferred method for determining the coding complexity of a video signal being encoded by an MPEG encoder 14 (of FIG. 3) utilizes the quantization scale factor (designated $Q_{MB}$) for each 16 by 16 macroblock and the number of bits (designated $T_{MB}$) used to encode that macroblock, for all the macroblocks in each picture or frame of the GOP. FIG. 5 is a block diagram of bit rate regulator 49 of the MPEG encoder 14 (of FIG. 3) and the complexity analyzer 16 (of FIG. 2) which generates a coding complexity representative signal according to this method. Various clock and control signals have been omitted from FIG. 5, to simplify it. However, what signals are required, and the necessary timing and voltage characteristics of these signals are well understood.

The complexity analyzer 16 illustrated in FIG. 5 is an example of a complexity analyzer utilizing information from the CBR encoder 14 only, as illustrated in phantom in FIG. 2. In FIG. 5, bit rate regulator 49 has a status input terminal $T_{MB}$ coupled to the status output terminal of output buffer 48 (of FIG. 3). The control output terminal $Q_{MB}$ of bit rate regulator 49 is coupled to the control input terminal of variable quantizer 46 (of FIG. 3). Regulator 49 further has a control input terminal (Q) coupled to a corresponding quota output terminal of the bit rate allocator 30 (of FIG. 1).

The status input terminal $T_{MB}$ of the bit rate regulator 49 is also coupled to a first input terminal of a first adder 92. An output terminal of the first adder 92 is coupled to an input terminal of a first latch 93. An output terminal of the first latch 93 is coupled to a first input terminal of a multiplier 94 and a second input terminal of the first adder 92. An output terminal of the multiplier 94 is coupled to an input terminal of a second latch 95. An output terminal of the second latch 95 is coupled to a coding complexity output terminal $X_{pic}$. Complexity output terminal $X_{pic}$ is coupled a corresponding complexity input terminal of bit rate allocator 30 (of FIG. 1).

The control output terminal $Q_{MB}$ of bit rate regulator 49 is also coupled to a first input terminal of a second adder 96.

An output terminal of the second adder 96 is coupled to an input terminal of a third latch 97. An output terminal of the third latch 97 is coupled to a numerator input terminal N of a divider 98 and to a second input terminal of the second adder 96. An output terminal of divider 98 is coupled to a second input terminal of the multiplier 94. A register 99 has an output terminal coupled to the denominator input terminal D of the divider 98.

In operation, for each macroblock, bit rate regulator 49 generates a quantizing scale factor signal $Q_{MB}$ for the variable quantizer 46, in a known manner, based on the current bit rate quota and the number of bits used to encode preceding pictures, and then receives a signal from the output buffer 48 indicating the number of bits $T_{MB}$ used to encode that macroblock. The variable quantizer 46 (of FIG. 3) quantizes the DCT coefficients in each macroblock in accordance with the quantizing scale factor $Q_{MB}$. The quantizing scale factor $Q_{MB}$ represents the quantizing step size, or percentage of the full dynamic range of the DCT coefficients in each quantizing level. A high value for $Q_{MB}$ means that there is a larger quantizing step size, and, consequently, fewer quantizing levels. Conversely, a low value for $Q_{MB}$ means that there is a smaller quantizing step size, and, consequently, more quantizing levels. In the preferred embodiment, $Q_{MB}$ is a five bit integer (having values between 1 and 31).

An average quantizing scale factor for all the macroblocks in a complete picture or frame (designated $Q_{pic}$) is then calculated as follows. At the beginning of each frame or picture, latches 93 and 97 are cleared to zero in response to a clear signal (not shown). The combination of the second adder 96 and the third latch 97 operate as an accumulator to continually sum the macroblock quantizing scale factors $Q_{MB}$ from the bit rate regulator 49. At the same time, the combination of the first adder 92 and the first latch 93 operate as an accumulator to continually sum the number of bits used thus far to encode the frame or picture.

After all of the macroblocks in a frame or picture (a number designated $N_{MB}$) have been processed, latch 97 contains the sum of all of the macroblock quantizing scale factors $Q_{MB}$ produced by bit rate regulator 49, and latch 93 contains the sum of all the bits used to encode the picture or frame $T_{pic}$. The divider 98 produces the quotient of the sum of all the macroblock quantizing scale factors $Q_{MB}$ in the picture or frame, divided by the number of macroblocks in the picture or frame $N_{MB}$. This quotient is the average quantizing scale factor $Q_{pic}$ for that frame or picture. The multiplier 94 produces the product of $Q_{pic}$ and $T_{pic}$, which coding complexity for that picture (designated $X_{pic}$), i.e. $X_{pic} = T_{pic} \cdot Q_{pic}$. At the end of the picture or frame, the coding complexity signal $X_{pic}$ is latched into the second latch 95 in response to a clock signal (not shown). The above described cycle then repeats for each frame or picture in the video signal being encoded.

The coding complexity $X_{pic}$ is then supplied from latch 95 to a complexity input terminal of the I/O controller 34 of the bit rate allocator 30 (of FIG. 4) which performs the remaining processing to obtain the coding complexity for the GOP. The coding complexity for a GOP (designated $X_{GOP}$) is the sum of the $X_{pic}$'s for all of the pictures in that GOP. (See equation (1)). The $\mu$P 31 acts as an accumulator by retrieving each $X_{pic}$ value from the I/O controller 34, and summing them over all of the frames or pictures in the GOP.

$$X_{GOP} = \sum_{\text{all pics in GOP}} T_{pic} \cdot Q_{pic} = \sum_{\text{all pic in GOP}} X_{pic} \quad (1)$$

The number of frames or pictures in a GOP (designated N) generally remains constant. While N is constant, $X_{GOP}$ can be calculated, on a sliding window basis, by adding the coding complexity value $X_{pic}$ of the latest picture, and subtracting the coding complexity value from the oldest picture in the GOP. In this case, an updated value of $X_{GOP}$ is available after each frame or picture. However, N can change. If N changes, then $X_{GOP}$ for the newly defined GOP must be calculated by summing the coding complexity values $X_{pic}$ from the new number of preceding pictures in the newly defined GOP, as in equation (1).

As described above, it is possible that different channels operate at different frame or picture rates, e.g. the standard video frame rate (in the U.S.) is 29.97 frames per second, for film images it is 24 frames per second, and for cartoons it is 15 frames per second. It is also possible that different channels have different numbers of pictures or frames in a GOP. Thus, it is possible that different channels have different GOP time periods. In order to accurately allocate bits to channels under such conditions, the GOP coding complexity values of the plurality of channels in such situations are time normalized in the bit rate allocator 30 by dividing the GOP complexity value from equation (1) for each channel by that channel's GOP time period (designated $GOP_{time}$). (See equation (2)). The normalized GOP coding complexity value (designated $Xnorm_{GOP}$) is then used to allocate bits among the different channels. The timing of the sampling of the complexity values, and the generation of quota values for such systems will be discussed in more detail below.

$$Xnorm_{GOP} = \frac{X_{GOP}}{GOP_{time}} \quad (2)$$

Referring back to FIG. 5, as described above, for each macroblock, bit rate regulator 49 generates a quantizing scale factor signal $Q_{MB}$ for variable quantizer 46, and then receives a signal from the output buffer 48 indicating the number of bits $T_{MB}$ used to encode that macroblock. These signals may alternatively be supplied directly to the I/O controller 34 in the bit rate allocator 30 (of FIG. 4). The $\mu$P 31 may then calculate the appropriate coding complexity measure (from equation (1) or equations (1) and (2)) internally.

Furthermore, in order to simplify the transmission, the coding complexity value for each picture $X_{pic}$ may be scaled. In a preferred embodiment, this value is scaled, after multiplier 94, into an eight bit number. This scaled value is then passed to the bit rate allocator 30 (of FIG. 4). It may also be desirable for the computer system to maintain a file of the picture complexity values $X_{pic}$, for example in a mass storage device (not shown), for other reasons, such as allowing recalculation of the coding complexity value in the event N changes. Storage of an hour of 8 bit $X_{pic}$ values will take 108 kilobytes (kB) for standard video and 86 kB for film.

In the discussion below, $X^i$ will represent the currently available appropriate one of either $X_{GOP}$ (if all channels have the same GOP time period) or $Xnorm_{GOP}$ from the $i^{th}$ channel processor. The bit rate allocator 30 (of FIG. 1) generates respective quota (Q) signals representing allocations of the available bits in the transmission link for the next quota period based on the coding complexity values $X^i$ from all of the K channel processors forming the plurality of channel processors 10. The predetermined transmission link bit rate from the output terminal of the multiplexer 20 (of FIG. 1) (designated R) is allocated among the plurality 10 of channel processors, so that the $i^{th}$ channel processor receives a bit rate allocation designated $R^i$.

One method for allocating bit rates in the transmission link to the different channels is a linear allocation based on the currently available coding complexity $X^i$ of the preceding GOP period (on a sliding window basis, as discussed above) for all of the plurality 10 of channel processors (of FIG. 1). In this method, each processor i receives the same proportion $R^i$ of the total bit capacity R as the coding complexity of that encoder $X^i$ bears to the total coding complexity of all the encoders. (See equation (3)).

$$R^i = \frac{X^i}{\sum_{j=1}^{K} X^j} R \qquad (3)$$

However, it has been found that there is a lower bit rate allocation below which the quality of a reproduced image drops precipitously. In addition, in the illustrated embodiment, the bit rate allocations for the next quota period depends upon the complexity measures from the preceding GOP. Thus, if there is a scene change from a simple image to a complex image, there may be insufficient bits allocated to encode the new, complex, scene because the allocation for the new scene was based on the preceding, simple, scene.

An alternative method for allocating bit rates in the transmission link to different channels guarantees a minimum bit rate allocation $RG^i$ to each encoder i, and allocates the remaining bits linearly, as in equation (3). (See equation (4)). Each channel may have a different guaranteed minimum bit rate depending upon the anticipated overall complexity of the video transmitted through the channel and/or pricing of the channel to the providers of the video signals.

$$R^i = RG^i + \frac{X^i}{\sum_{j=1}^{K} X^j} \left[ R - \sum_{j=1}^{K} RG^j \right] \qquad (4)$$

Yet another alternative method for allocating bits in the transmission link to different channels provides a weighting factor $P^i$ for each encoder i and allocates bits proportionately according to the coding complexity values $X^i$, as weighted by the weighting factors $P^i$. (See equation (5)). As in the guaranteed minimum allocation method of equation (4), the weighting factors $P^i$ may depend on anticipated overall complexity of the video signal transmitted through the channel and/or pricing of the channel to the provider of the video signals.

$$R^i = \frac{P^i X^i}{K} R \qquad (5)$$

$$\sum_{j=1}^{K} P^j X^j$$

A preferred method for allocating bits in the transmission link to different channels is a combination of the weighted allocation method of equation (5) and the guaranteed minimum allocation method of equation (4). In this method each channel is guaranteed a minimum allocation, and the remaining bits are allocated on a weighted proportion basis. (See equation (6)).

$$R^i = RG^i + \frac{P^i X^i}{\sum_{j=1}^{K} P^j X^j} \left[ R - \sum_{j=1}^{K} RG^j \right] \qquad (6)$$

As above, both the guaranteed minimum allocation and the weighting factors may depend upon the anticipated overall complexity of the video signal transmitted over the channel and/or pricing of the channel to the provider of the video signals.

It is possible to further refine the bit allocations $R^i$, in response to other parameters of the system. For example, it has been found that there is an upper bit rate allocation value above which no improvement in the quality of the reproduced image is visible. Thus, an allocation of bits in excess of this upper allocation value is wasteful of bits in the transmission link. Also, the operator of the transmission link may impose a maximum bit rate allocation $R_{max}$ (which can reflect the above upper bit rate allocation value) and/or a minimum bit rate allocation $R_{min}$ for each channel.

In addition, in order to minimize the potential for bit rate control oscillations and thus maximize bit rate control stability, there may be imposed a maximum increment of increase $\alpha$ and/or decrease $\beta$ in the bit rate allocation from one quota period to the next for a channel. As above, the values of the upper bit rate allocation value, the maximum and minimum bit rate allocations, and maximum increments of increase and decrease, may be different for the different channels, and may depend on the anticipated overall complexity of the video signal to be transmitted through this channel and/or the pricing of the channel to the provider of the video signals. In addition, it is possible for the maximum and minimum increments of increase and decrease to vary dynamically according to the degree of emptiness or fullness of the buffers in the channel.

Furthermore, the allocated bit rates may be further refined in order to provide buffer management, e.g. to ensure that the output buffers of the CBR encoders 10 (of FIG. 1) and the input buffers of the corresponding receiver decoders (not shown) do not overflow or underflow. Explicit buffer management is not necessary if the encoder buffer size E is controlled as illustrated in inequality (7), where D is the fixed decoder buffer size. If the encoder buffer size is selected according to inequality (7), the bit rate allocation may vary from $R_{min}$ to $R_{max}$ without inducing overflow or underflow in either the encoder or decoder buffers. However, this method unduly limits the size of the encoder buffer, thus, unduly limiting the rate control flexibility.

$$E \le D \frac{R_{\min}}{R_{\max}} \quad (7)$$

An alternative buffer management scheme is adaptive and uses the current, instantaneous bit rates for buffer management, rather than the fixed parameters $R_{min}$ and $R_{max}$. Because the decoder buffer size was selected to be able to process data transmitted at the highest rate, $R_{max}$, the bit rate allocation can always be increased (to the system maximum, $R_{max}$) without overflowing the decoder buffer. However, there is an instantaneous minimum bit rate which must be maintained in order to assure that the data already in the encoder buffer gets transmitted to the decoder buffer before its decode time. Thus, a minimum bit rate allocation to ensure that the decoder buffer does not underflow must be dynamically calculated.

In dynamically calculating this minimum bit rate allocation, when decreasing the bit rate allocation, both a newly determined encoder buffer size, and the amount of data already placed in the encoder buffer in some preceding amount of time must be taken into account. The newly determined encoder buffer size for frame n, designated $E_n$, is determined in accordance with equation (8) in $$E_n = \Delta R_{new} = \frac{R_{new}}{R_{\max}} D \quad (8)$$

which $\Delta$ is the system delay time, which a constant time delay between when a frame of video arrives at the encoder and when that frame is displayed at the decoder; D is the fixed decoder buffer size; and $R_{new}$ is the new proposed bit rate allocation. This buffer size ensures that in steady state at the new bit rate allocation, there will be no overflow or underflow in the encoder and decoder buffers.

However, as described above, if the newly proposed bit rate allocation has been decreased, then there is a transition period, equal to the system delay time $\Delta$, in which there may be too many bits already in the encoder buffer to be transmitted successfully to the decoder at the new lower rate. One proposed method for refining the newly proposed bit rate allocation is first to examine the number of bits, designated e, actually placed into the encoder buffer (buffer fullness) for the number of preceding frames in the system delay time $\Delta$, designated $\Gamma$. Then the maximum buffer fullness number for the preceding $\Gamma$ frames (designated $e_{max\Gamma}$) is compared to the newly determined encoder buffer size $E_n$, from equation (8). The minimum reduced bit rate allocation $R_{reduced}$ for channel i which guarantees that all the bits from the preceding $\Gamma$ frames will be transmitted successfully to the receiver decoder, then, is given in equation (9).

$$R^i_{reduced} = \frac{e_{\max \Gamma}}{\Delta} \quad (9)$$

If such limits are imposed in a multiplexer system, then after bit rate allocations have been calculated according to equations (3), (4), (5) or (6), those bit rate allocations are checked to determine whether they fall within the current upper and lower limits for that channel. First, the upper and lower limits for each channel i are determined. The upper limit bit rate allocation for any quota period k (designated $R^i_{upper}[k]$) is the minimum of: the maximum permissible increased allocation over the previous quota period k−1; and the maximum bit rate allocation limit. (See equation (10)).

The lower limit bit allocation for any quota period k, $R^i_{lower}[k]$, is the maximum of: the minimum bit rate allocation $$R^i_{upper}[k] = \min\{R^i_{max}, (1+\alpha)R^i[k-1]\} \quad (10)$$

limit; the minimum permissible decreased allocation over the previous quota period k−1 and the minimum reduced bit rate allocation from equation (9). (See equation (11)). Then adjustments in the bit rate allocations for the channels are made.

$$R^i_{lower}[k] = \max\{R^i_{min}, (1-\beta)R^i[k-1], e_{max}\Gamma/\Delta\} \quad (11)$$

If the allocated bit rate for any channel exceeds either limiting value, the bit rate allocation for that channel is set to that limiting value, and the available remaining bit rate is reallocated among the other channels. For example, if the bit rate allocated to a channel i, as calculated in equation (3), (4), (5) or (6), is greater than the upper limit for that channel, as calculated in equation (10), then the bit rate for channel i is set to that upper limit $R^i_{upper}$. If, conversely, the bit rate is less than the lower limit calculated in equation (11), then the bit rate is set to that lower limit $R^i_{lower}$. (See equation (12)).

$$R^i[k] = \begin{cases} R^i_{lower}(k) & \text{if } R^i[k] < R^i_{lower}[k] \\ R^i_{upper}[k] & \text{if } R^i[k] > R^i_{upper}[k] \\ R^i[k] & \text{otherwise} \end{cases} \quad (12)$$

If any of the bit rate allocations are changed by the limiting operations of equations (10), (11), and (12), then the remaining available bit rate is reallocated among the non-limited channels in accordance with equation (3), (4), (5) or (6). Then these channels are again checked against the limits in equations (10), (11) and (12). This cycle is repeated until all bit rate allocations are finalized. In the above embodiment, the coding complexity period is the GOP period, determined picture by picture on a sliding window basis, which is of sufficient duration that changes in bit rate allocations in a channel from one quota period to the next should generally be relatively small. Consequently, equations (10), (11) and (12) should only rarely be invoked.

The timing of the coding complexity sampling and generation of updated bit rate quotas based on the coding complexities is complicated if the channels are operating with different GOP time periods. There are two approaches which yield accurate coding complexity sampling and bit rate quota allocation in this situation. In the first approach, a constant quota period is calculated in such a manner that each channel has an equal number of quota periods in each GOP. In this approach, the number of sample and quota periods per GOP may vary from channel to channel, but, for any channel, the number of such sample and quota periods within a GOP is constant. In the second approach, a sample is taken, and new allocation generated whenever any channel begins a new GOP, and the number of bits allocated in the new quota is calculated taking into account the length of the time period from the previous sample to the current sample.

Figure 7:
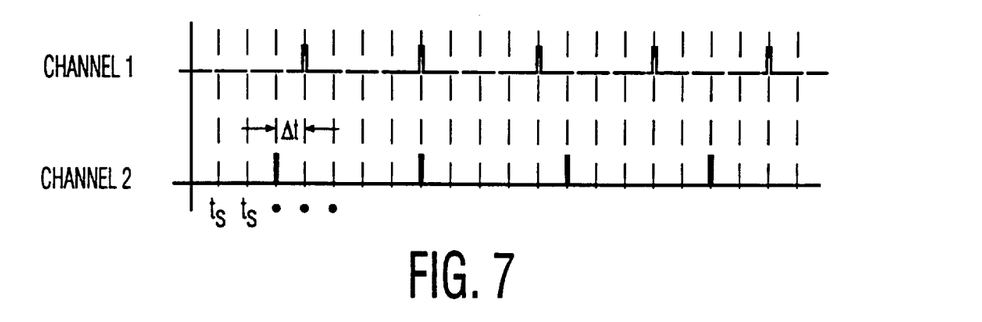

FIG. 7 is a timing diagram illustrating the sampling and quota updates in a system using the first approach. In order to simplify the drawing, only two channels are illustrated. In FIG. 7, channel 1 is an example of a channel transmitting standard video having a frame rate of 30 frames per second (in the U.S.). Channel 2 is an example of a channel transmitting a film having a frame rate of 24 frames per second. Each of the channels is assumed to have 12 frames per GOP. Channel 1, thus, starts a new GOP every 0.4 seconds, or 2.5 GOPs per second, while channel 2 starts a new GOP every 0.5 seconds, or 2 GOPs per second. The sampling rate selected is one sample every 0.1 seconds. Thus, in channel 1, there are four sample and quota updates in every GOP, and in channel 2 there are five sample and quota updates in every GOP. The sampling times, $t_s$, are illustrated by vertical dashed lines. Because the time periods between samples $\Delta t$ is constant (0.1 seconds), equations (3) through (12), above, may be used without any modification in calculating the bit rate allocations for the next sample period. These bit rate allocations may be accumulated and used in the channel processors 10 (of FIG. 1) according to the known scheme termed the "token and leaky bucket" scheme.

Figure 8:
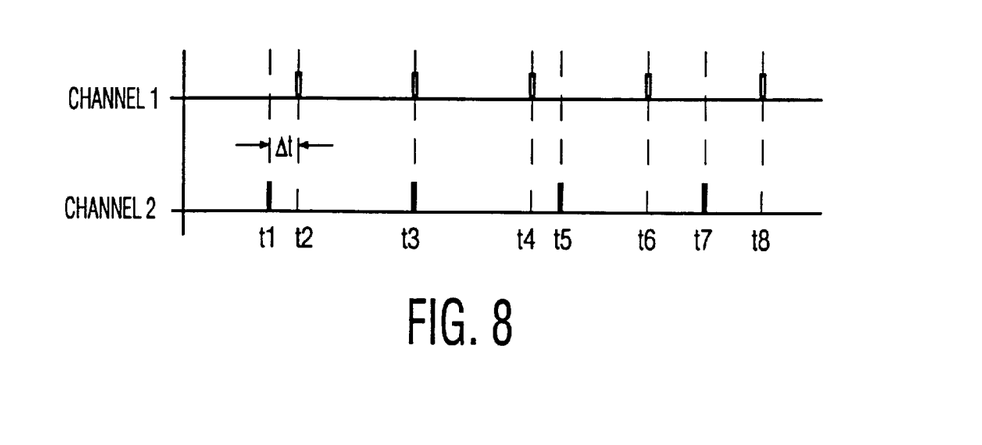

FIG. 8 is a timing diagram illustrating the sampling of coding complexity values and quota updating in a system using the second approach, described above. The respective channels illustrated in FIG. 8 are carrying the same signals as in FIG. 7. In FIG. 8, samples of the coding complexity values from all the channels are taken whenever any channel begins a new GOP. New allocations are generated based on the values of those samples, and the time period $\Delta t$ since the last sample. These sample times are illustrated in FIG. 8 as vertical dashed lines t1–t8, where t2, t3, t4, t6 and t8 correspond to starts of GOPs in channel 1, and t1, t3, t5 and t7 correspond to starts of GOPs in channel 2. Although t3 illustrates a sampling time corresponding to starts of GOPs in both channel 1 and 2, there is no requirement that such a time occur.

At each sample time, the current coding complexity values (from the preceding GOP, available picture by picture on a sliding window basis) in all the channels are sampled. Equations (3) through (12) may be used to calculate the next bit rate quota proportions, but in determining the actual number of bits available to be allocated, the amount of time $\Delta t$ since the last sample must be taken into account. In order to properly compensate for the different sample periods, the total available bit rate R in equations (3) through (12) is replaced with the number of bits available for allocation, designated C, which is the product of the total available bit rate R and the sample period $\Delta t$, i.e. C=R$\Delta t$. The number of bits calculated by equations (3) through (12) are then allocated to the respective channel processors 10 (of FIG. 1) which, as above, use the "token and leaky bucket" scheme to accumulate and use the allocated bits. Either of the above two above approaches will accurately allocate bit rates to the respective channel processors 10 when the video signals from the different channels 5 have different GOP time periods.

Figure 6:
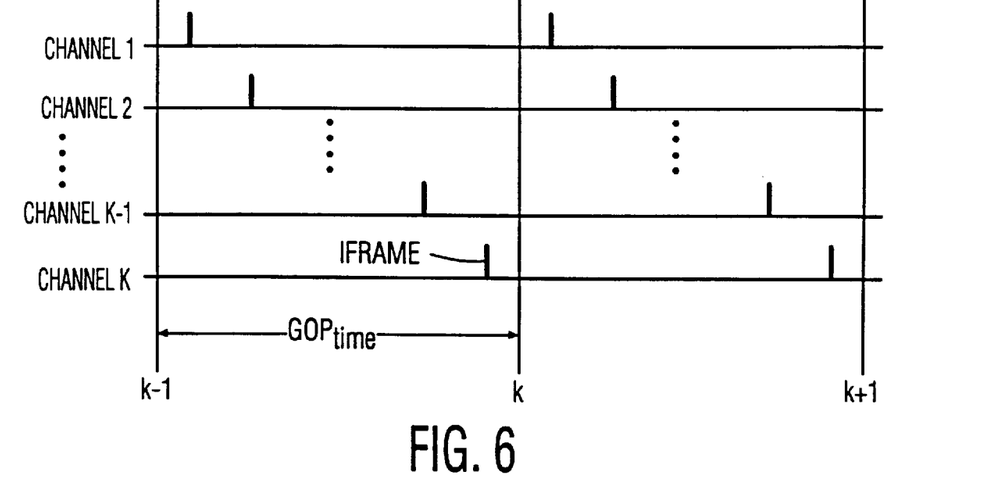
FIGS. 6, 7 and 8 are timing diagrams illustrating the sampling of complexity information.

The timing of the sampling of coding complexity values and the generation of updated bit rate quotas for the different channels may be simplified if all of the channels are operating at the same frame rate, and have the same number of frames in a GOP, i.e. all the channels have the same GOP time period, $GOP_{time}$. FIG. 6 is a timing diagram illustrating coding complexity sample and quota update timing in such a system. In FIG. 6, each horizontal line corresponds to a respective channel 1–K. The short vertical lines extending upward from the horizontal lines represent the time when coding of an I frame is begun for that channel, which is considered to be the beginning of a GOP for that channel. The time period for a GOP, $GOP_{time}$, is equal in all of the channels, but, as can be seen, the beginning times of the GOPs for the respective channels are different. In fact, it has been found desirable to have different starting times for the GOPs for the respective channels so that coding of I frames do not overlap. This increases the complexity variations across the different channels.

It has been found that so long as the same number of I frames, P frames, and B frames are taken into account in calculating the coding complexity value, it does not matter that those frames come from different GOPs. Thus, as shown by the solid lines extending across all the channel's time axes, a coding complexity value sample may be taken simultaneously from all the channels at any time within a GOP. Updates of the bit rate quotas for all of the channels may then be generated from that sample and transmitted back to the channel processors 10 (of FIG. 1).

The above multiplexer system has been described as a collocated system. However, the plurality 10 of channel processors could reside in remote locations from the bit rate allocator 30 and the multiplexer 20. In such a system, communication links would be established between the encoders and the bit rate allocator. In this case, some portion of the bits transmitted between the processors 10 and the multiplexer could be dedicated to transmission of complexity information from the processors.

What is claimed is:

1. Complexity determining apparatus, comprising:
    an encoder, having an input terminal responsive to a data input signal and a data output terminal producing a coded output signal representing the data input signal at a constant bit rate, and including a variable quantizer, responsive to the data input signal, for producing a quantized signal, representing the data input signal, having a quantizing step size set in response to a quantizing step size control signal;
    a bit rate regulator for producing the quantizing step size control signal in response to the bit rate of the coded output signal and a quota input signal; and
    a complexity analyzer, responsive to the quantizing step size control signal, and the coded output signal, for generating a complexity representative signal being related to the quantizing step size and the bit rate of the coded output signal; wherein
    the complexity analyzer generates the complexity representative signal being directly proportional to an average of the quantizing step size and to the bit rate of the coded output signal.

2. The apparatus of claim 1 wherein the complexity analyzer (16) generates the complexity representative signal ($X_{pic}$) being the product of the average of the quantizing step size ($Q_{pic}$) and the bit rate of the coded output signal ($T_{MB}$).

3. Complexity determining apparatus, comprising:
    an encoder, having an input terminal responsive to a data input signal and a data output terminal producing a coded output signal representing the data input signal at a constant bit rate, and including a variable quantizer, responsive to the data input signal, for producing a quantized signal, representing the data input signal, having a quantizing step size set in response to a quantizing step size control signal;
    a bit rate regulator for producing the quantizing step size control signal in response to the bit rate of the coded output signal and a quota input signal; and
    a complexity analyzer, responsive to the quantizing step size control signal, and the coded output signal, for generating a complexity representative signal being related to the quantizing step size and the bit rate of the coded output signal; wherein
    the data signal is a video signal comprising sequential groups of pictures, each group of pictures comprising a predetermined number of sequential frames;

the encoder operates according to the motion picture experts group standard, divides each sequential frame in the video signal into a predetermined number of macroblocks, and sequentially encodes each of the predetermined number of macroblocks into respective numbers of bits to produce the coded output signal comprising a sequence of coded pictures;

the bit rate regulator produces respective quantizing step size control signals for each of the predetermined number of macroblocks; and the complexity analyzer comprises;

a first accumulator, coupled to the data output terminal of the encoder, for summing the respective numbers of bits produced at the data output terminal of the encoder for each encoded macroblock, to produce a total number of bits in each one of the sequence of coded pictures;

a second accumulator, coupled to the bit rate regulator, for summing the respective quantizing step size control signals for each macroblock in each one of the sequential pictures;

an averaging circuit, coupled to the second accumulator, for calculating the average quantizing step size signal for the predetermined number of macroblocks in each one of the sequential pictures, to produce an average quantizing step size signal for each one of the sequence of coded pictures;

a multiplier, coupled to the first accumulator and the averaging circuit, for multiplying the total number of bits times the average quantizing step size signal, to produce a picture complexity signal for each one of the sequential pictures; and a third accumulator for summing the respective picture complexity signals for each of the pictures in a group of pictures, to produce the complexity representative signal.

* * * * *